United States Patent
Song et al.

(10) Patent No.: US 10,302,133 B2
(45) Date of Patent: May 28, 2019

(54) SEALING STRUCTURE FOR BEARING

(71) Applicants: Hongwei Song, Shanghai (CN); Ling Nan, Shanghai (CN); Fuqiang Cai, Suzhou (CN); Uwe Niebling, Diespeck (DE); Zhiheng Liu, Shanghai (CN); Xin Liu, Shanghai (CN)

(72) Inventors: Hongwei Song, Shanghai (CN); Ling Nan, Shanghai (CN); Fuqiang Cai, Suzhou (CN); Uwe Niebling, Diespeck (DE); Zhiheng Liu, Shanghai (CN); Xin Liu, Shanghai (CN)

(73) Assignee: Schaeffler Technologies AG & Co. KG, Herzogenaurah (DE)

( * ) Notice: Subject to any disclaimer, the term of this patent is extended or adjusted under 35 U.S.C. 154(b) by 0 days.

(21) Appl. No.: 15/747,299

(22) PCT Filed: Jun. 1, 2016

(86) PCT No.: PCT/CN2016/084281
§ 371 (c)(1),
(2) Date: Jan. 24, 2018

(87) PCT Pub. No.: WO2017/024861
PCT Pub. Date: Feb. 16, 2017

(65) Prior Publication Data
US 2018/0216667 A1 Aug. 2, 2018

(30) Foreign Application Priority Data

Aug. 7, 2015 (CN) .......................... 2015 1 0484653

(51) Int. Cl.
*F16C 33/78* (2006.01)
*F16C 33/80* (2006.01)
(Continued)

(52) U.S. Cl.
CPC ............ *F16C 33/80* (2013.01); *F16C 19/364* (2013.01); *F16C 33/78* (2013.01); *F16C 33/7813* (2013.01); *F16C 19/386* (2013.01)

(58) Field of Classification Search
CPC .. F16C 33/78; F16C 33/7813; F16C 33/7879; F16C 33/7883; F16C 33/80; F16C 33/805
See application file for complete search history.

(56) References Cited

U.S. PATENT DOCUMENTS 4,632,404 A 12/1986 Feldle et al.
5,890,812 A * 4/1999 Marcello ............. F16C 33/7813
384/148

(Continued)

FOREIGN PATENT DOCUMENTS

CN 101460771 A 6/2009
CN 201339657 Y 11/2009
(Continued)

OTHER PUBLICATIONS

Chinese Office Action; CN106438715A; 6 pages; dated Mar. 7, 2019 from the Chinese Patent Office.

*Primary Examiner* — James Pilkington
(74) *Attorney, Agent, or Firm* — Kevin L. Parks

(57) ABSTRACT

Bearing sealing structures are disclosed, which may include first and second frameworks configured to attach to an outer ring and an inner ring, respectively, and an elastic sealing member. The first framework may include a first radially extending part extending towards the inner ring, the second framework may include a second radially extending part extending towards the outer ring, and the second radially extending part may be located on an axially outer side of the first radially extending part. The sealing structure may form a first chamber and a second chamber in a radial direction, the first chamber being formed by the first or second radially extending part. The second chamber may be located on a (Continued)

radially inner side of the first chamber, and the elastic sealing member may include a first sealing member extending into the first chamber and a second sealing member extending into the second chamber.

16 Claims, 5 Drawing Sheets

(51) Int. Cl.
  *F16C 19/36* (2006.01)
  *F16C 19/38* (2006.01)

(56) References Cited

U.S. PATENT DOCUMENTS

| | | | |
|---|---|---|---|
| 5,909,249 A | 6/1999 | Sathe et al. | |
| 6,170,992 B1 | 1/2001 | Angelo et al. | |
| 8,342,535 B2 * | 1/2013 | Lattime | F16C 33/7813 |
| | | | 277/412 |
| 2003/0156772 A1 | 8/2003 | Yamashita et al. | |
| 2012/0207417 A1 * | 8/2012 | Walter | F16C 33/7883 |
| | | | 384/477 |

FOREIGN PATENT DOCUMENTS

| | | | |
|---|---|---|---|
| CN | 101660582 A | | 3/2010 |
| CN | 102066791 A | | 5/2011 |
| CN | 102575774 A | | 7/2012 |
| CN | 104595367 A | | 5/2015 |
| CN | 104620029 A | | 5/2015 |
| JP | H10110695 A | | 4/1998 |
| JP | 2005076723 A | | 3/2005 |
| JP | 2007285499 A | | 11/2007 |
| JP | 5048347 A | | 1/2008 |
| JP | 2009197884 A | | 9/2009 |
| JP | 2009220103 A | | 10/2009 |
| JP | 2011099464 A | | 5/2011 |
| JP | 5327603 | * | 10/2013 |
| JP | 2014177954 A | | 9/2014 |
| KR | 20010066684 A | | 7/2001 |
| KR | 100483162 A | | 6/2004 |
| WO | 12049059 A1 | | 4/2012 |

* cited by examiner

SEALING STRUCTURE FOR BEARING

CROSS-REFERENCE TO RELATED APPLICATIONS

This application is the U.S. National Phase of PCT Appln. No. PCT/CN2016/084281 filed Jun. 1, 2016, which claims priority to CN 201510484653.6 filed Aug. 7, 2015, the entire disclosures of which are incorporated by reference herein.

TECHNICAL FIELD

The present disclosure relates to the technical field of bearings and in particular to a sealing structure for a bearing.

BACKGROUND

As shown in FIGS. 1 and 2, an existing bearing comprises an outer ring 1, an inner ring 2, a number of rollers 3 accommodated between the inner and outer rings, and sealing structures 4 which perform a sealing action on two sides, in the axial direction, of the bearing. The sealing structure 4 comprises an accommodating member 41 fixed to an outer surface of the inner ring 2, a support 42 fixed to an inner surface of the outer ring 2, and a sealing member 43 connected to the support 42. The accommodating member 41 comprises a first axially extending part 411 held securely to the outer surface of the inner ring 2 in the axial direction, a second axially extending part 412 located on a radially outer side of the first axially extending part 411 and spaced apart from the first axially extending part 411, and a radially extending part 413 connecting the first axially extending part 411 to the second axially extending part 412. The first axially extending part 411, the second axially extending part 412 and the radially extending part 413 enclose an accommodating chamber 44 which is open towards the interior of the bearing. The sealing member 43 partially extends to the accommodating chamber 44, and specifically comprises a first sealing lip 431 extending towards the first axially extending part 411 and a second sealing lip 432 extending towards the second axially extending part 412, wherein the first sealing lip 431 is in contact with the first axially extending part 411, thereby forming a contact seal, and a radial gap is present between the second sealing lip 432 and the second axially extending part 412, thereby forming a gap seal. Furthermore, the sealing member 43 also comprises a third sealing lip 433 extending axially, the third sealing lip 433 being located outside the accommodating chamber 44, specifically being located on a radially outer side of the second axially extending part 412 and forming a gap seal with the second axially extending part 412.

The existing sealing structure 4 is too large in the axial direction, and correspondingly, the axial dimension of the inner ring 2 must also be increased; this will make bearing installation inconvenient in application scenarios in which the installation space is relatively cramped. In addition, during use, external dirty water, greasy dirt or particulate impurities easily enter the accommodating chamber 44 through the gap between the third sealing lip 433 and the second axially extending part 412, and are not easily flung out during bearing operation. At the same time, lubricating oil in the bearing also readily enters the accommodating chamber 44, and this easily leads to early failure of the sealing member 43.

Thus, there is a need to provide a new sealing structure to solve the abovementioned problem.

SUMMARY

The problem solved by the present disclosure is to provide a sealing structure which occupies little space in the axial direction while being able to realize good sealing.

To solve the abovementioned problem, the present disclosure may employ the following technical solution: A sealing structure for a bearing, comprising a first framework for fixing to a bearing outer ring, a second framework for fixing to a bearing inner ring, and an elastic sealing member, the first framework comprising a first radially extending part extending towards the bearing inner ring, the second framework comprising a second radially extending part extending towards the bearing outer ring, and the second radially extending part being located on an axially outer side of the first radially extending part; the sealing structure forms at least a first chamber and a second chamber in a radial direction, the first chamber is formed by the first radially extending part or the second radially extending part alone, the second chamber is located on a radially inner side of the first chamber, and the elastic sealing member comprises a first sealing member extending into the first chamber and a second sealing member extending into the second chamber.

The first sealing member and the second sealing member are attached to the first radially extending part, and the second radially extending part forms the first chamber.

The second framework also comprises a second axially extending part connected to the second radially extending part and extending towards the inside of the bearing, the second radially extending part comprises a bent part located on a radially outer side and a folded part located in a middle position and extending towards the inside of the bearing, the first chamber is formed between the bent part and the folded part, and the second chamber is formed between the folded part and the second axially extending part.

The first sealing member comprises a first lip extending obliquely towards the bent part and a second lip extending obliquely towards the folded part.

The bent part comprises a first section bent inwards and a second section bent outwards sequentially, the first lip forming a gap seal with the first section, and the second lip forming a gap seal or a contact seal with a radially outer surface of the folded part.

The elastic sealing member also comprises a third sealing member attached to the first radially extending part, the third sealing member having an inclined inner surface, and the third sealing member being located on a radially outer side of the second radially extending part and forming a gradually narrowing opening with the second section.

The bent part extends in the axial direction towards the inside of the bearing, the first lip forming a gap seal with the bent part, and the second lip forming a gap seal or a contact seal with a radially outer surface of the folded part.

The sealing member also comprises a third sealing member attached to the first radially extending part, the third sealing member being located on a radially outer side of the second radially extending part and forming a long, narrow channel with the bent part.

The first sealing member is attached to the second radially extending part, the second sealing member is attached to the first radially extending part, and the first radially extending part forms the first chamber.

The second framework also comprises a second axially extending part connected to the second radially extending part and extending towards the inside of the bearing, the first radially extending part comprises a folded part located in a middle position and extending towards an outer side of the bearing, and a tail part located at an extremity and extending towards an outer side of the bearing, the first chamber being formed between the folded part and the tail part, and the second chamber being formed between the tail part and the second axially extending part.

The first sealing member comprises a first lip extending obliquely towards the folded part, and a second lip extending obliquely towards the tail part.

A gap seal is formed between the first lip and the folded part, and the second lip forms a gap seal or a contact seal with a radially outer surface of the tail part.

The first sealing member also comprises a third lip extending obliquely towards the folded part, and an inner surface of the folded part is an inclined surface and forms a gradually narrowing opening with the third lip.

A groove facing the inner surface of the folded part is formed between the third lip and the first lip.

The second sealing member comprises a number of projections extending towards the second axially extending part, the projections being distributed at intervals in the axial direction, and a gap being present between each projection and the second axially extending part; a labyrinth seal is thereby formed.

The second sealing member also comprises a protruding part extending in the axial direction towards the inside of the bearing, and an extremity of the second axially extending part is provided with a bent plate extending in a radial direction; the protruding part covers the bent plate in a radial direction, and a space is formed between the protruding part and the bent plate.

An inner surface of the protruding part is inclined close to the space.

Compared with the prior art, the present disclosure has the following advantages: a multi-stage sealing design is used in the radial direction of the bearing, thereby reducing the axial dimension of the sealing structure, and guaranteeing a desirable sealing effect while facilitating installation of the bearing.

DETAILED DESCRIPTION

Figure 1:
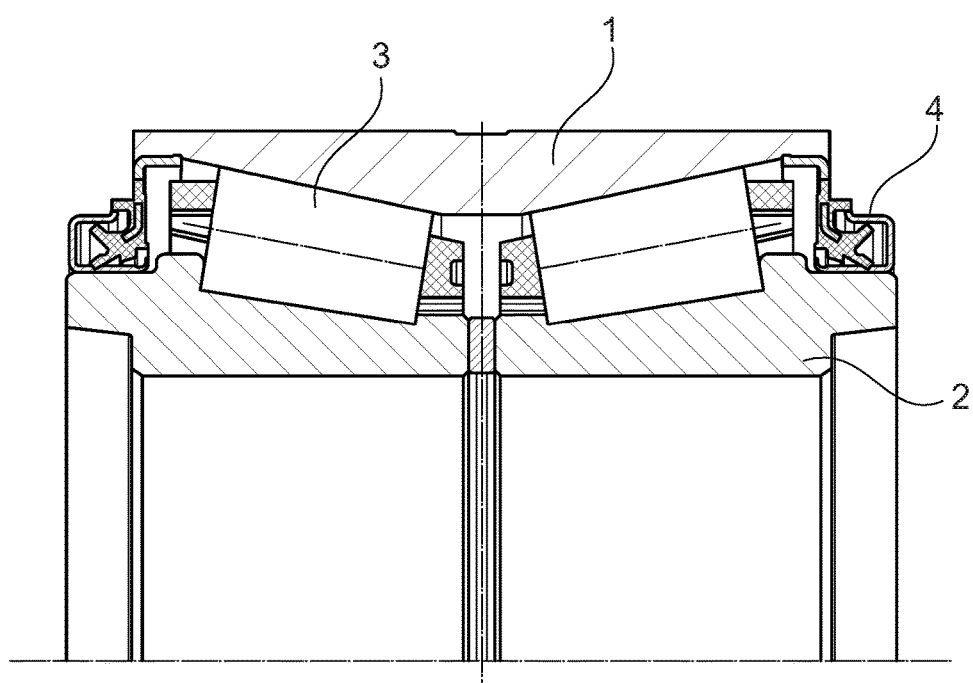
FIG. 1 is a sectional view of a bearing with a sealing structure in the prior art.
Figure 2:
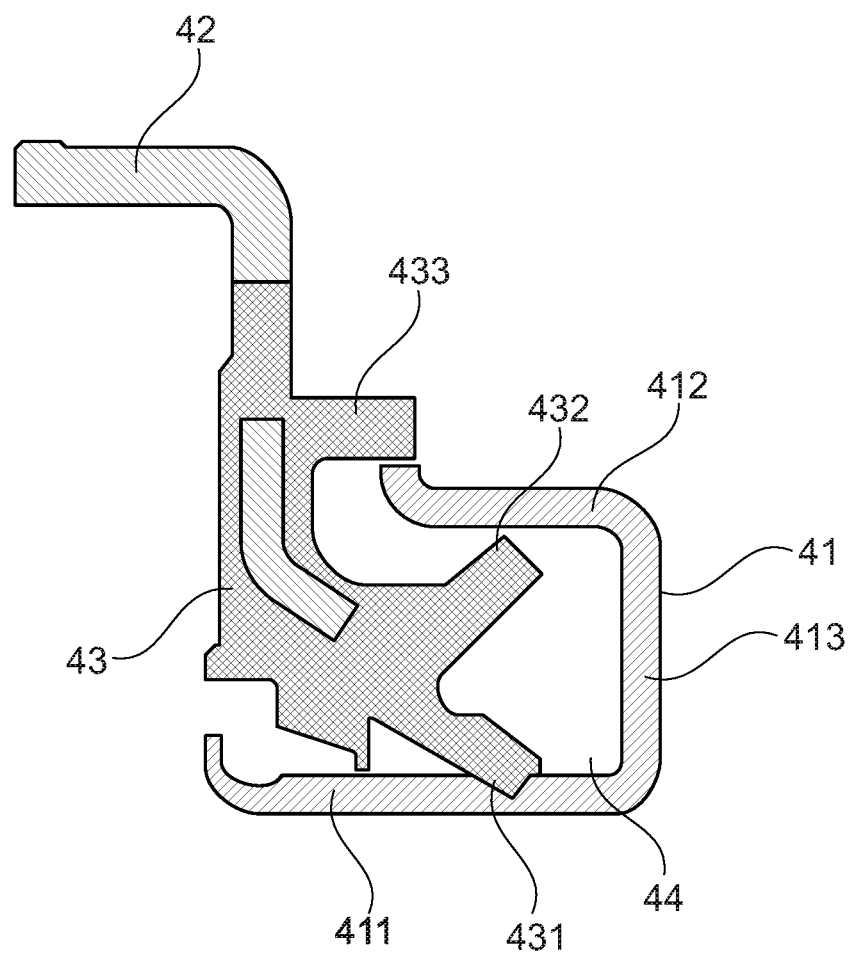
FIG. 2 is an enlarged view of the sealing structure in FIG. 1.
Figure 3:
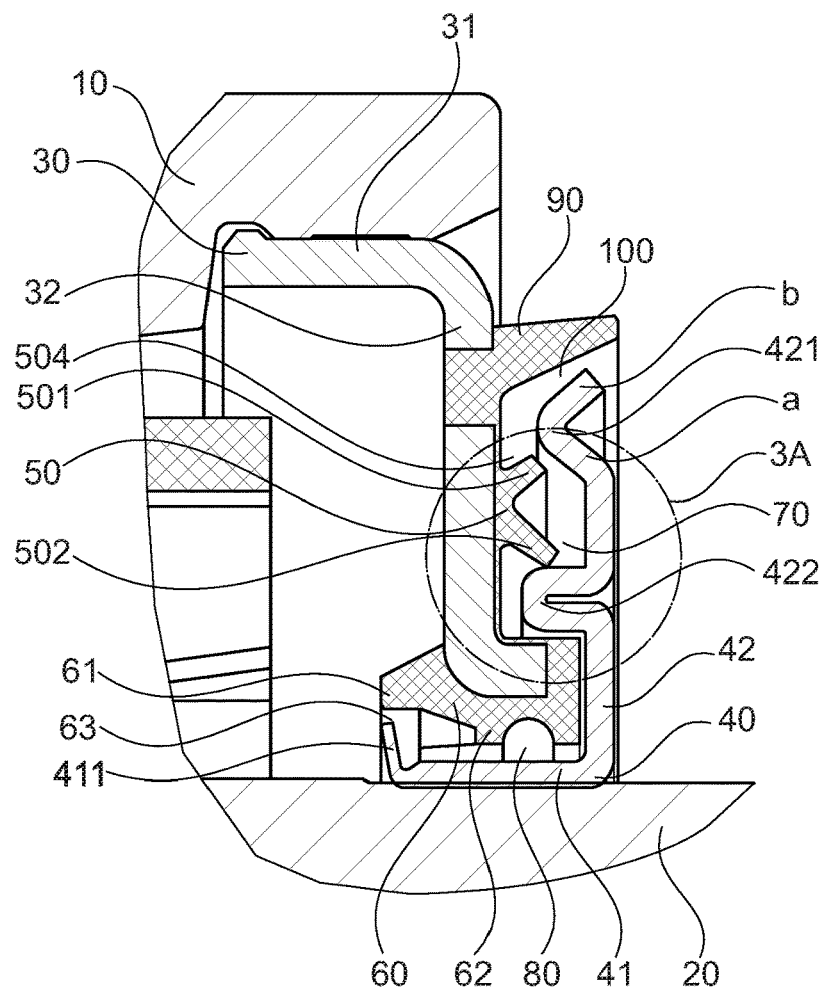
FIG. 3 is a sectional view of a sealing structure in a first embodiment of the present disclosure.

FIG. 3 shows a schematic sectional view of a sealing structure in a first embodiment of the present disclosure. The sealing structure comprises a first framework 30 fixed to a bearing outer ring 10 and a second framework 40 fixed to a bearing inner ring 20. An integrally formed elastic sealing member is attached to the first framework 30; specifically, the first framework 30 comprises a first axially extending part 31 fixed to the bearing outer ring 10, and a first radially extending part 32 connected to the first axially extending part 31 and extending towards the bearing inner ring 20. The elastic sealing member is attached to the first radially extending part 32, and comprises a first sealing member 50 and a second sealing member 60 which are spaced apart in a radial direction. The second framework 40 comprises a second axially extending part 41 fixed to the bearing inner ring 20, and a second radially extending part 42 connected to the second axially extending part 41 and extending towards the bearing outer ring 10. Specifically, the second radially extending part 42 is spaced apart from the first radially extending part 32 in the axial direction and is located on an axially outer side of the first radially extending part 32. The second radially extending part 42 is provided on a radially outer side with a bent part 421 which is first bent inwards and then bent outwards, wherein an inwardly bent portion is defined as a first section a, and an outwardly bent portion is defined as a second section b. Furthermore, the second radially extending part 42 is also provided in a middle position with a folded part 422 extending towards the inside of the bearing in the axial direction, so that a first chamber 70 is formed between the bent part 421 and the folded part 422, and a second chamber 80 is formed between the folded part 422 and the second axially extending part 41.

Figure 3A:
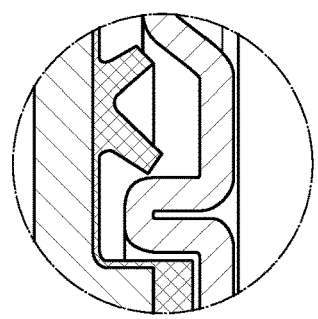
FIG. 3A is a detail view of a portion of the sealing structure of FIG. 3 showing a gap seal.

The elastic sealing member also comprises a third sealing member 90; an inner surface of the third sealing member 90 is an inclined surface. The third sealing member 90 is located on a radially outer side of the second radially extending part 42, and a gradually narrowing opening 100 is formed between the third sealing member and the second section b, thereby realizing centrifugal sealing. The first sealing member 50 comprises a first lip 501 and a second lip 502 extending into the first chamber 70. Specifically, the first lip 501 extends obliquely towards the first section a, and a gap seal is formed between the first lip and the first section a; the second lip 502 extends obliquely towards the folded part 422, and forms a contact seal or a gap seal (ref. FIG. 3A) with a radially outer surface of the folded part 422. Furthermore, a groove 504 is formed between the first lip 501 and the first radially extending part 32; if external dirty water or particles enter the interior of the sealing structure from the gradually narrowing opening 100, the dirty water or particles will first of all remain in the groove 504, and most of the dirty water or particles will be flung out under the action of centrifugal force.

The second sealing member 60 extends into the second chamber 80, and comprises a protruding part 61 extending in the axial direction towards the inside of the bearing, and a number of projections 62 extending towards the second axially extending part 41. Furthermore, an extremity of the second axially extending part 41 is provided with a bent plate 411 extending in a radial direction; the protruding part 61 covers the bent plate 411 in a radial direction, and a space 63 is formed between the protruding part and the bent plate 411, so that lubricating oil inside the bearing cannot easily enter the sealing structure. Furthermore, an inner surface of the protruding part 61 is inclined close to the space 63, so that even if a small amount of lubricating oil enters the sealing structure, it will easily flow back into the interior of the bearing again under the action of centrifugal force. The projections 62 are distributed at intervals in the axial direction, and a gap is present between each projection and the second axially extending part 41; a labyrinth seal is thereby formed, further preventing leakage of lubricating oil.

Figure 4:
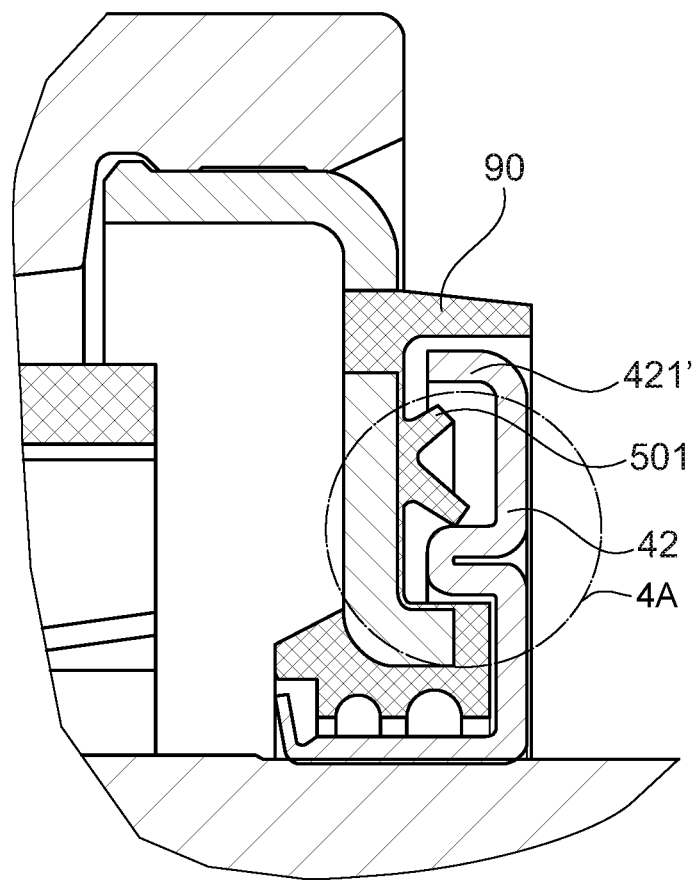
FIG. 4 is a sectional view of a sealing structure in a second embodiment of the present disclosure.
Figure 4A:
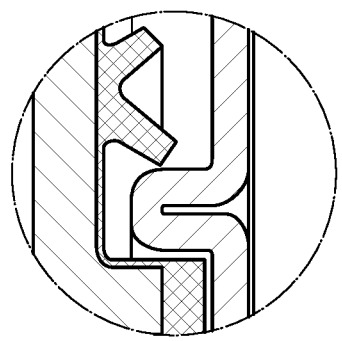
FIG. 4A is a detail view of a portion of the sealing structure of FIG. 4 showing a gap seal.

As shown in FIG. 4, a sealing structure in a second embodiment of the present disclosure is slightly different from the sealing structure in the first embodiment. This is principally manifested in the fact that a bent part 421' of a second radially extending part 42 in the second embodiment has a different structure from the bent part 421 in the first embodiment. The bent part 421' extends in the axial direction towards the inside of the bearing, so that a long, narrow channel is formed between a third sealing member 90 and the bent part 421', and it is very difficult for external dirty water and impurities to enter the interior of the bearing. Correspondingly, a first lip 501 extends obliquely towards the bent part 421', and a gap seal is formed between the first lip and the bent part 421'.

Figure 5:
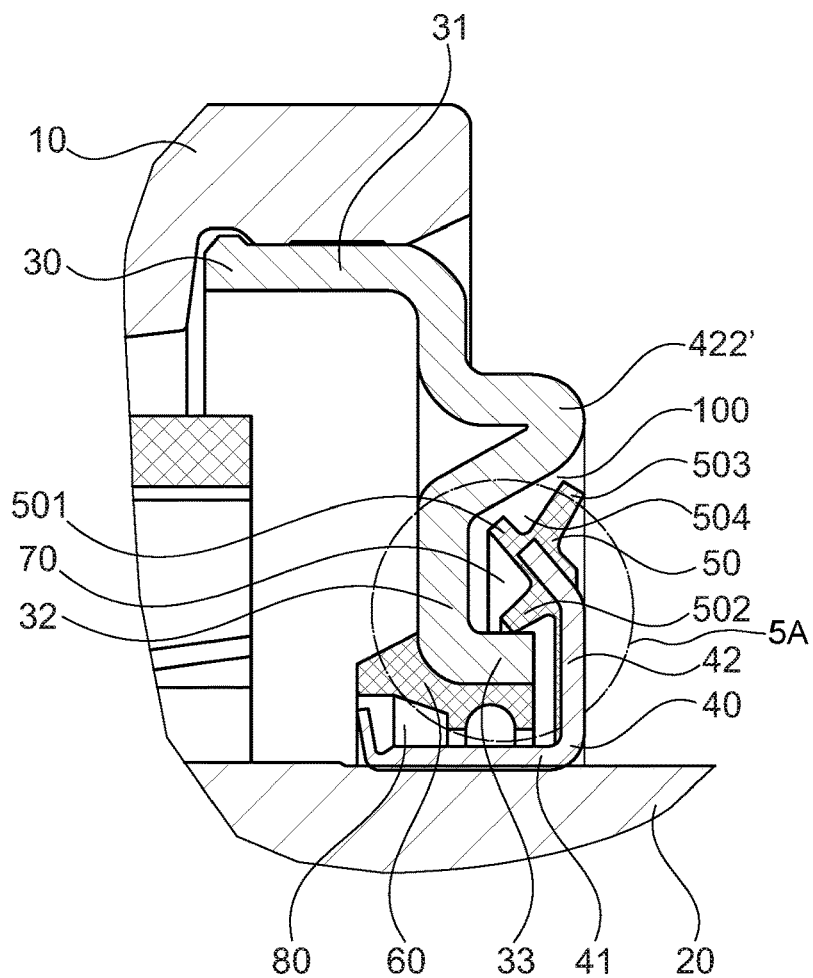
FIG. 5 is a sectional view of a sealing structure in a third embodiment of the present disclosure.

FIG. 5 shows a schematic sectional view of a sealing structure in a third embodiment of the present disclosure. The sealing structure comprises a first framework 30 fixed to a bearing outer ring 10, and a second framework 40 fixed to a bearing inner ring 20. An integrally formed second sealing member 60 is attached to the first framework 30; specifically, the first framework 30 comprises a first axially extending part 31 fixed to the bearing outer ring 10, a tail part 33 extending in the axial direction towards an outer side of the bearing, and a first radially extending part 32 connecting the first axially extending part 31 to the tail part 33. An integrally formed first sealing member 50 is attached to the second framework 40. Specifically, the second framework 40 comprises a second axially extending part 41 fixed to the bearing inner ring 20, and a second radially extending part 42 connected to the second axially extending part 41 and extending towards the bearing outer ring 10. The second radially extending part 42 is spaced apart from the first radially extending part 32 in the axial direction and is located on an axially outer side of the first radially extending part 32. In this embodiment, a folded part 422' is disposed in a middle position of the first radially extending part 32 and extends in the axial direction towards an outer side of the bearing. A first chamber 70 is formed between the folded part 422' and the tail part 33, and a second chamber 80 is formed between the tail part 33 and the second axially extending part 41.

Figure 5A:
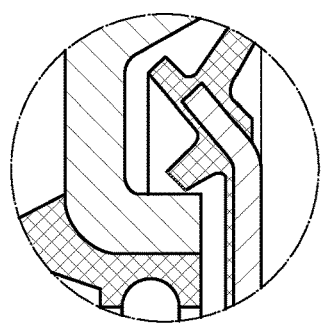
FIG. 5A is a detail view of a portion of the sealing structure of FIG. 5 showing a gap seal.

The first sealing member 50 comprises a first lip 501 and a second lip 502 extending into the first chamber 70, and a third lip 503. Specifically, an inner surface of the folded part 422' is an inclined surface; the first lip 501 extends obliquely towards the inner surface of the folded part 422' and forms a gap seal with the inner surface of the folded part 422'; the second lip 502 extends obliquely towards the tail part 33 and forms a contact seal or a gap seal (ref. FIG. 5A) with a radially outer surface of the tail part; the third lip 503 also extends obliquely towards the inner surface of the folded part 422', and forms a gradually narrowing opening 100 with the inner surface of the folded part 422', thereby realizing centrifugal sealing. A groove 504 facing the inner surface of the folded part 422' is formed between the first lip 501 and the third lip 503; if external dirty water or particles enter the interior of the sealing structure from the gradually narrowing opening 100, the dirty water or particles will first of all remain in the groove 504, and most of the dirty water or particles will be flung out under the action of centrifugal force.

A sealing member in the prior art must not only prevent external dirt from entering the bearing interior, but must also prevent leakage of lubricating oil, and therefore has a complex structure, and occupies a lot of space in the axial direction. In the present disclosure, the first sealing member on the radially outer side principally guards against external dirt, while the second sealing member on the radially inner side principally prevents the leakage of lubricating oil, so the structure of the sealing members is simplified, with an overall reduction in the axial dimension of the sealing structure. Furthermore, the design of the present disclosure, with multi-stage sealing in the radial direction, enhances the sealing result while facilitating installation.

Although the present disclosure only describes certain demonstrative embodiments, these descriptions should only serve as examples, and do not constitute a limitation. Various changes are possible within the scope recorded in the attached claims, without departing from the spirit and scope of the present disclosure.

The invention claimed is:

1. A sealing structure for a bearing, comprising:
a first framework configured to attach to a bearing outer ring, a second framework configured to attach to a bearing inner ring, and an elastic sealing member;
the first framework including a first radially extending part extending radially inward, the second framework including a second radially extending part extending radially outward, an axially extending part connected to the second radially extending part and extending towards the first radially extending part, a bent part located on a radially outer side, and a folded part located in a middle position and extending towards the first radially extending part, and the second radially extending part being located on an axially outer side of the first radially extending part, wherein:
the sealing structure forms at least a first chamber and a second chamber in a radial direction;
the first chamber is formed between the bent part and the folded part;
the second chamber is located on a radially inner side of the first chamber and formed between the folded part and the axially extending part; and,
the elastic sealing member comprises a first sealing member extending into the first chamber and a second sealing member extending into the second chamber, the first sealing member including a first lip extending obliquely towards the bent part and a second lip extending obliquely towards the folded part.

2. The sealing structure for a bearing as claimed in claim 1, wherein the bent part includes a first section bent inwards and a second section bent outwards sequentially, the first lip forming a gap seal with the first section, and the second lip forming a gap seal or a contact seal with a radially outer surface of the folded part.

3. The sealing structure for a bearing as claimed in claim 2, wherein the elastic sealing member also includes a third sealing member attached to the first radially extending part, the third sealing member having an inclined inner surface, and the third sealing member being located on a radially outer side of the second radially extending part and forming a narrowing opening with the second section.

4. The sealing structure for a bearing as claimed in claim 1, wherein the bent part extends in an axial direction towards the first radially extending part, the first lip forming a gap seal with the bent part, and the second lip forming a gap seal or a contact seal with a radially outer surface of the folded part.

5. The sealing structure for a bearing as claimed in claim 4, wherein the sealing member also includes a third sealing member attached to the first radially extending part, the third sealing member being located on a radially outer side of the second radially extending part and forming a channel with the bent part.

6. A sealed bearing comprising:
an outer ring;
an inner ring; and,
the sealing structure of claim 1.

7. A sealing structure for a bearing comprising:
a first framework configured to attach to a bearing outer ring, a second framework configured to attach to a bearing inner ring, and an elastic sealing member;
the first framework including a first radially extending part extending radially inward, the second framework including a second radially extending part extending radially outward, and the second radially extending part being located on an axially outer side of the first radially extending part, wherein:
the sealing structure forms at least a first chamber and a second chamber in a radial direction;
the first chamber is formed by the first radially extending part;
the second chamber is located on a radially inner side of the first chamber;
the elastic sealing member comprises a first sealing member extending into the first chamber and a second sealing member extending into the second chamber;
the first sealing member is attached to the second radially extending part; and,
the second sealing member is attached to the first radially extending part.

8. The sealing structure for a bearing as claimed in claim 6, wherein the second framework also includes an axially extending part connected to the second radially extending part and extending towards the inside of the bearing, the first radially extending part includes a folded part located in a middle position and extending towards an outer side of the bearing, and a tail part located at an extremity and extending towards an outer side of the bearing, the first chamber being formed between the folded part and the tail part, and the second chamber being formed between the tail part and the axially extending part.

9. The sealing structure for a bearing as claimed in claim 8, wherein the first sealing member includes a first lip extending obliquely towards the folded part, and a second lip extending obliquely towards the tail part.

10. The sealing structure for a bearing as claimed in claim 9, wherein a gap seal is formed between the first lip and the folded part, and the second lip forms a gap seal or a contact seal with a radially outer surface of the tail part.

11. The sealing structure for a bearing as claimed in claim 10, wherein the first sealing member also includes a third lip extending obliquely towards the folded part, and an inner surface of the folded part is an inclined surface and forms a narrowing opening with the third lip.

12. The sealing structure for a bearing as claimed in claim 11, wherein a groove facing the inner surface of the folded part is formed between the third lip and the first lip.

13. A sealed bearing comprising:
an outer ring;
an inner ring; and,
the sealing structure of claim 7.

14. A sealing structure for a bearing, comprising:
a first framework configured to attach to a bearing outer ring, a second framework configured to attach to a bearing inner ring, and an elastic sealing member;
the first framework including a first radially extending part extending radially inward, the second framework including a second radially extending part extending radially outward, an axially extending part connected to the second radially extending part and extending towards the first radially extending part, a bent part located on a radially outer side, and a folded part located in a middle position and extending towards the first radially extending part, and the second radially extending part being located on an axially outer side of the first radially extending part, wherein:
the sealing structure forms at least a first chamber and a second chamber in a radial direction;
the first chamber is formed between the bent part and the folded part;
the second chamber is located on a radially inner side of the first chamber and formed between the folded part and the axially extending part;
the elastic sealing member comprises a first sealing member extending into the first chamber and a second sealing member extending into the second chamber; and,
the second sealing member includes a number of projections extending towards the axially extending part, the projections being distributed at intervals in an axial direction, and a gap being present between each projection and the axially extending part forming a labyrinth seal.

15. The sealing structure for a bearing as claimed in claim 14, wherein the second sealing member also includes a protruding part extending in the axial direction towards the inside of the bearing, and an extremity of the axially extending part is provided with a bent plate extending in a radial direction; the protruding part covers the bent plate in a radial direction, and a space is formed between the protruding part and the bent plate.

16. A sealed bearing comprising:
an outer ring;
an inner ring; and,
the sealing structure of claim 14.

* * * * *